United States Patent [19]

Marriott, Jr. et al.

[11] 4,247,000
[45] Jan. 27, 1981

[54] CERAMIC CONVEYOR ROLLS WITH METAL END CAPS CLAMPED THERETO

[75] Inventors: William H. Marriott, Jr., Altoona; Vaughn R. Imler, Tyrone, both of Pa.

[73] Assignee: PPG Industries, Inc., Pittsburgh, Pa.

[21] Appl. No.: 57,784

[22] Filed: Jul. 16, 1979

[51] Int. Cl.³ ............................................. B65G 13/02
[52] U.S. Cl. .................................. 198/780; 432/246; 403/371
[58] Field of Search ................. 198/780; 64/1 R, 1 C, 64/1 S; 432/246; 403/290, 342, 371, 372; 79/41, 52, 53

[56] References Cited

U.S. PATENT DOCUMENTS

| | | |
|---|---|---|
| Re. 19,205 | 6/1934 | Blythe . |
| 766,261 | 8/1904 | Jebsen . |
| 1,395,913 | 11/1921 | Ford . |
| 1,872,062 | 8/1932 | Burke . |
| 2,152,076 | 3/1939 | Menough . |
| 2,407,032 | 9/1946 | Myers . |
| 2,482,662 | 9/1949 | Dunne . |
| 2,612,395 | 9/1952 | Russell . |
| 2,634,144 | 4/1953 | Friedman . |
| 2,788,957 | 4/1957 | Lindquist . |
| 3,489,397 | 1/1970 | Alexander . |
| 3,608,876 | 9/1971 | Leaich et al. . |
| 3,867,748 | 2/1975 | Miller . |
| 4,022,536 | 5/1977 | Piepho ................................ 403/371 |
| 4,034,837 | 7/1977 | Vinarcsik et al. . |
| 4,131,420 | 12/1978 | Miller . |
| 4,140,413 | 2/1979 | Conrad ................................ 403/371 |
| 4,140,486 | 2/1979 | Nitschke ............................. 432/246 |

Primary Examiner—Robert B. Reeves
Assistant Examiner—B. Bond
Attorney, Agent, or Firm—Edward I. Mates

[57] ABSTRACT

A composite metal end cap for use with a ceramic roll in a ceramic roll conveyor for conveying glass sheets for thermal treatment comprising a flexible metal inner end cap member adapted for mounting in direct contact over an end of the ceramic roll and a rigid metal outer end cap member adapted for mounting over the inner end cap member, and means for moving said outer end cap member axially relative to said inner end cap member so as to increase radial clamping of said flexible metal inner end cap member against said ceramic roll on axially inward motion of said rigid, outer end cap member relative thereto in a controlled manner and to permit release of said flexible radial clamping between said flexible, metal, inner end cap member and said ceramic roll in response to an opposite direction of axial movement of said rigid, metal, outer end cap member.

5 Claims, 7 Drawing Figures

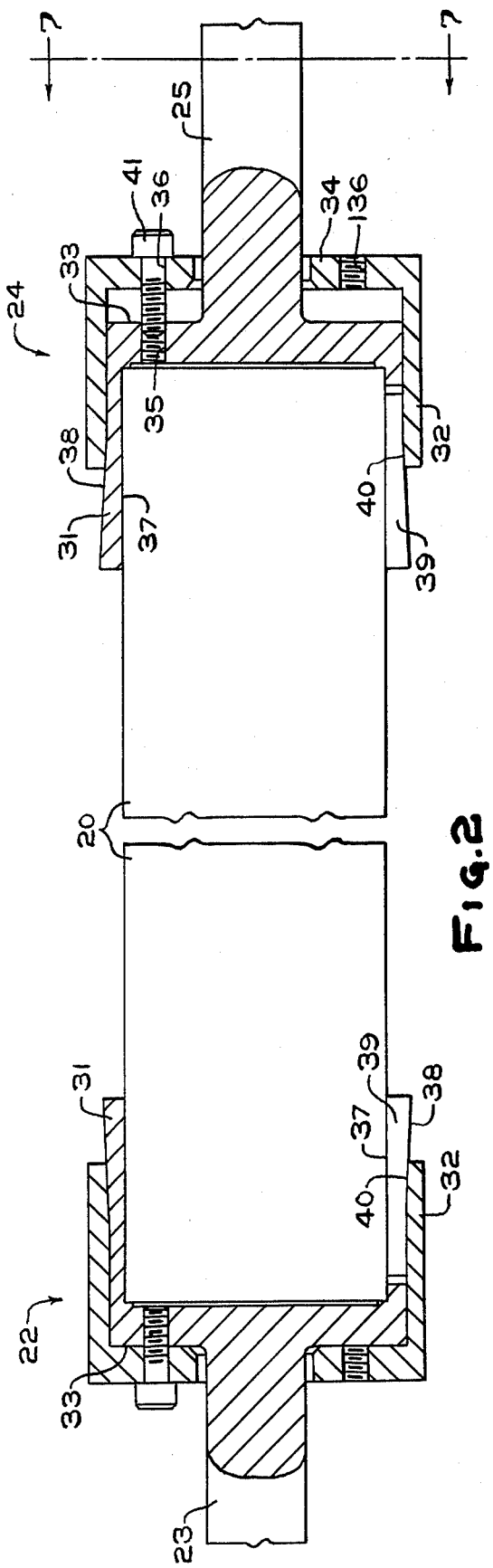
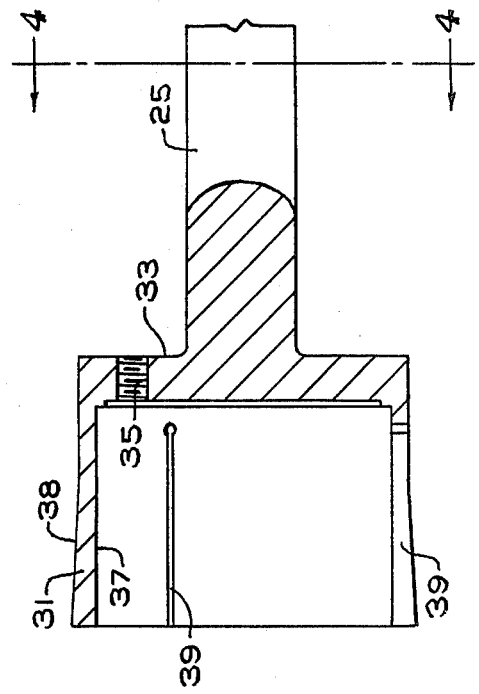
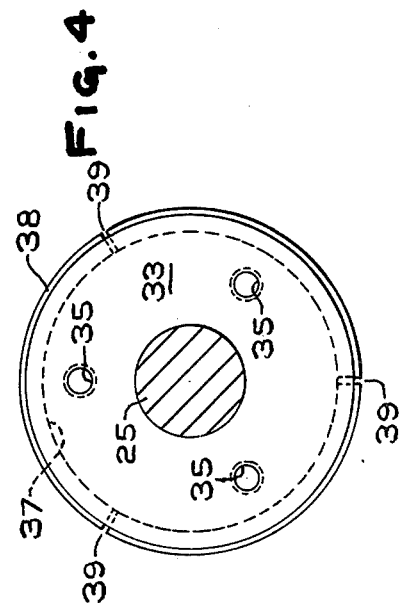

CERAMIC CONVEYOR ROLLS WITH METAL END CAPS CLAMPED THERETO

BACKGROUND OF THE INVENTION

1. Field of the Invention

The present invention relates to frangible, ceramic conveyor rolls designed for use in the heat treatment of glass sheets wherein the rolls are rotated to transport a series of glass sheets through a hot enclosed atmosphere.

Furnaces for tempering or annealing glass conventionally include conveyors which carry glass sheets through an enclosed atmosphere of high temperature during the annealing or tempering of the glass. A so-called roller hearth-type of conveyor utilized to carry glass sheets includes horizontally extending conveyor rolls of ceramic material on which heated glass sheets are rotatably supported. Rotating the conveyor rolls drives the glass sheets by friction over the rolls through an enclosed furnace atmosphere of high temperature.

One ceramic material utilized to form cylindrically shaped rolls for a roller hearth is a sintered fused silica material that is made by grinding solid fused silica into small particles and then sintering these particles to each other at a temperature below the fusing temperature. Such a material is readily formed into an elongated shape required for the rolls of the roller hearth. In addition, fused silica rolls so formed have a relatively small coefficient of thermal expansion. This latter characteristic is extremely desirable due to extreme temperatures to which the rolls in the roller hearth are subjected during use.

One conventional way for rotatably supporting and driving heated glass conveyor rolls of fused silica and other ceramic compositions utilizes bearings that support the opposite end portions of the rolls in the roller hearth. A drive member having a toothed drive component such as a gear or a chain sprocket drives the roll at one end. A metallic end cap rotatable with a driven shaft is conventionally used to transmit the drive from the drive gear or chain sprocket to the end of the ceramic roll.

Rolls of ceramic composition are superior to metal rolls in high temperature environments for several reasons. First of all, ceramic rolls have a low coefficient of thermal expansion compared to that of metal rolls so that they are less likely to warp. Ceramic rolls are less likely to oxidize and flake off and develop pock marking in their glass engaging surface. However, ceramic materials are difficult to work and are quite frangible. Furthermore, such rolls composed of ceramic material cannot be connected directly to the drive mechanisms needed to rotate the rolls. The use of metal end caps with ceramic rolls for roller hearths has been developed to a certain extent. However, they have introduced problems of securing the metallic end caps to the ends of the ceramic rolls that they drive in transmitting a torque from the driving mechanism. One method involves an adhesive bond between the end cap and the end of the ceramic roll. Another method involves shrinking a metallic end cap onto the roll end by heat shrinking. Both of these methods have drawbacks. Adhesives presently known require an extended cure period of at least about 24 hours before the ceramic roll is securely fixed to its end cap. Such a delay is too long to accept for mass production operations.

Heat shrinking requires heating the metallic end cap to a very high temperature so that its diameter increases to enable it to be shrunk fit over the end of the ceramic roll. The internal diameter of the end cap and the outer diameter of the ceramic roll must be closely matched so that the end of the roll is small enough to be inserted into the heated end cap but large enough to be securely clamped after cooling. Often it is necessary to machine one or both of the matching parts in order to provide suitable matching. At the inner end of the metallic cap, the ceramic roll is subjected to a clamping pressure due to the heat shrinking of the end cap. Adjacent to this portion of the ceramic roll subjected to the clamping pressure is an adjacent portion free of the clamping pressure. At this location of the boundary between a high clamping pressure and no clamping pressure, ceramic rolls are subject to fracture due to the high stresses involved.

Fused silica and other ceramic composition rolls are more fragile than metallic rolls. Hence, devices suitable for rapidly coupling and uncoupling metal driving shafts to metal conveyor rolls for the purpose of transmitting rotating forces from metal driving shafts to rotate metal rolls used to convey sheet materials by rolling friction have been considered impractical for use with ceramic rolls. Connectors between rotating metal elements such as between a wheel hub and an axle or spindle thereof or between metal elements of pulleys, gears, sprockets or sheaves and comprising split tapered sleeves adapted to be tightened and contracted on a metal shaft by an axially movable element which is clamped by cap screws or bolts and readily released by the use of jack screws have been limited in the past to metal structures in the belief that ceramic materials such as fused silica do not lend themselves to clamping action by metal gripping members because of the inherent frangibility of ceramic materials. Hence, there existed a need to provide means for attaching ceramic conveyor rolls to metal drive shafts that did not cause a metal to ceramic connection of the type that would cause the metal to induce breakage of the fragile ceramic rolls and to provide ready disconnection between the ceramic roll and the metal drive shaft whenever the occasion required same.

2. Description of the Prior Art

U.S. Pat. No. 2,152,076 to Menough discloses metal alloy conveyor rolls having end portions provided with axially extending slots at their inner portions and a center portion provided with axially extending slots at their end portions. Welds are provided in the axially extending slots of the center portion to connect the end portions thereto. The end portions are inserted within the ends of the center portion. The axially extending slots of the end portions permit the end portions to expand as the center portion expands radially due to an increase in temperature, even though the end portions do not heat as rapidly as the center portion of the rolls.

U.S. Pat. No. 3,608,876 to Leaich et al discloses pin and slot connections between ceramic hearth rollers and metal shafts. The fragility of ceramic rolls makes such pin and slot connections impractical.

U.S. Pat. No. 3,867,748 to Miller discloses the use of an adhesive for securing metal end caps to the ends of cylindrical ceramic conveying rollers in a roller hearth. The rolls cannot be used until the adhesive is cured. Since curing is a slow process, such rolls are not practical for rapid installation for high-speed production operations.

U.S. Pat. No. 4,131,420 to Miller utilizes a two-piece coupling that disconnects a ceramic roll including its end cap from a drive train which provides a rotating force to the end cap of the ceramic roll. The end cap in this patented apparatus is attached to the ceramic roll using an adhesive in a manner similar to that of the previous patent.

U.S. Pat. No. 4,140,486 to Nitschke utilizes a metallic spring end cap for rotatably driving a glass conveyor roll of ceramic material using helical spring coils that have a diameter in an undeflected condition slightly less than the diameter of the end of the ceramic roll so that coil deflection increasing the coil diameter allows mounting the coils over the end of the ceramic roll and a subsequent release clamps the coils over the end of the roll. The helical spring coil may be engaged by friction or by tooth sprocket or gear driven rolls to transmit a force thereto.

Other patents reported in a novelty search include U.S. Pat. No. 766,261 to Jebsen, which discloses a drive shaft provided with spring fingers; U.S. Pat. No. Re. 19,205 to Blythe, which discloses a flexible coupling between a conveyor roll and a drive shaft that consists of a collar or sleeve telescoped over the adjacent ends of the associated drive shaft and roll shaft and loosely connected therewith by bolts arranged transversely of each other; U.S. Pat. No. 1,395,913 to Ford that shows a metal hub construction in which a split tapered bushing has ribs that are received in a plurality of longitudinal and circumferentially disposed grooves or ways in the outer end of an axle and tightened about the axle when screw bolts draw the hub and bushing together; U.S. Pat. No. 1,872,062 to Burke, which shows means for connecting end roll sections to a center roll section in a manner that allows for different expansion and contraction thereof; U.S. Pat. No. 2,407,032 to Myers, U.S. Pat. No. 2,482,662 to Dunne and U.S. Pat. No. 2,612,395 to Russell all show longitudinally split sleeves adapted to be interposed between the hub and shaft of a pulley and provided with a tapered periphery to adjust the radial clamping force between the shaft and the hub on axial movement of the hub; U.S. Pat. No. 2,634,144 to Friedman shows a metal roll secured to a roll shaft by a tapered split sleeve arrangement which permits adjustment of the roll axially with respect to the roll shaft; U.S. Pat. No. 2,788,957 to Lindquist, which shows a composite refractory roller comprising hollow refractory sections under compression; U.S. Pat. No. 3,489,397 to Alexander, which discloses a frictional drive between a ceramic rod and a sleeve that comprises a substantially U-shaped spring that is mounted on a pin that is attached to the hub of a sprocket and that has spring legs received in slots formed on opposite sides of the sleeve so that the legs frictionally engage the rod; and U.S. Pat. No. 4,034,837 to Vinarcsik et al that discloses flanged metal rolls secured to mating flanges on stub shafts by bolts and separable from one another by jack shafts.

SUMMARY OF THE INVENTION

The present invention relates to a glass sheet conveyor comprising a series of rolls of ceramic composition having an axially elongated substantially cylindrical shape including an intermediate portion of round cross-section for conveying the glass sheets for thermal treatment connected to a metal shaft at each end. Each shaft is mounted for rotation with a composite end cap comprising an inner relatively flexible metal end cap member fixed concentrically in contacting relation directly to said shaft to be rotatable therewith and having an inner surface in circumferential engagement with the ceramic roll at one end portion thereof, and an outer, relatively rigid metal end cap member more rigid than said inner end cap member surrounding said inner end cap member, and means causing said outer end cap member to move axially with respect to the ceramic roll to control the amount of clamping force of the flexible, metal, inner end cap member against the ceramic roll.

Means is provided to facilitate the mounting of the composite metal end cap to an end of the ceramic roll. This is the provision of an apertured outer circular wall in the outer end cap member having at least one aperture to relieve air pressure when the outer end cap member is fitted over the inner end cap member to increase the clamping force of the latter radially against an end of the ceramic roll. The absence of this aperture in the outer circular wall would cause pressure to be built up as the space between an inner surface of the outer end cap member and an outer surface of the inner end cap member is compressed when the metal outer end cap member is forced over the outer surface of the inner end cap member to clamp the latter against the end portion of the ceramic roll.

In a specific embodiment of the present invention, the apertured outer circular wall of the end cap comprising the metal cylindrical member is provided with at least two apertures. One of the apertures provides an air passage and the other is adapted to receive an elongated threaded bolt that serves as a jack screw to help separate the end cap members from one another in an axial direction.

The features of the present invention are readily apparent from the description of a preferred embodiment which follows.

BRIEF DESCRIPTION OF THE DRAWINGS

In the drawings that form part of a description of a specific embodiment of the present invention.

FIG. 2 is an enlarged, fragmentary view of an opposite pair of end caps showing how they are mounted to the ends of a ceramic roll with the central portion of the roll and shaft connections omitted in order to show the metal end cap connections in as large a scale as possible with the end cap to the left shown in its fully clamped state and the end cap to the right shown in a lightly clamped condition;

FIG. 3 is a view of an empty inner cap member and part of its integral shaft, with part broken away to show another part in section, showing how the inner cap member is slit axially to increase its flexibility in a radial direction;

FIG. 4 is a cross-sectional view taken along line 4—4 of FIG. 3 showing how the inner cap is provided with an apertured head;

DESCRIPTION OF THE PREFERRED EMBODIMENT

Figure 1:
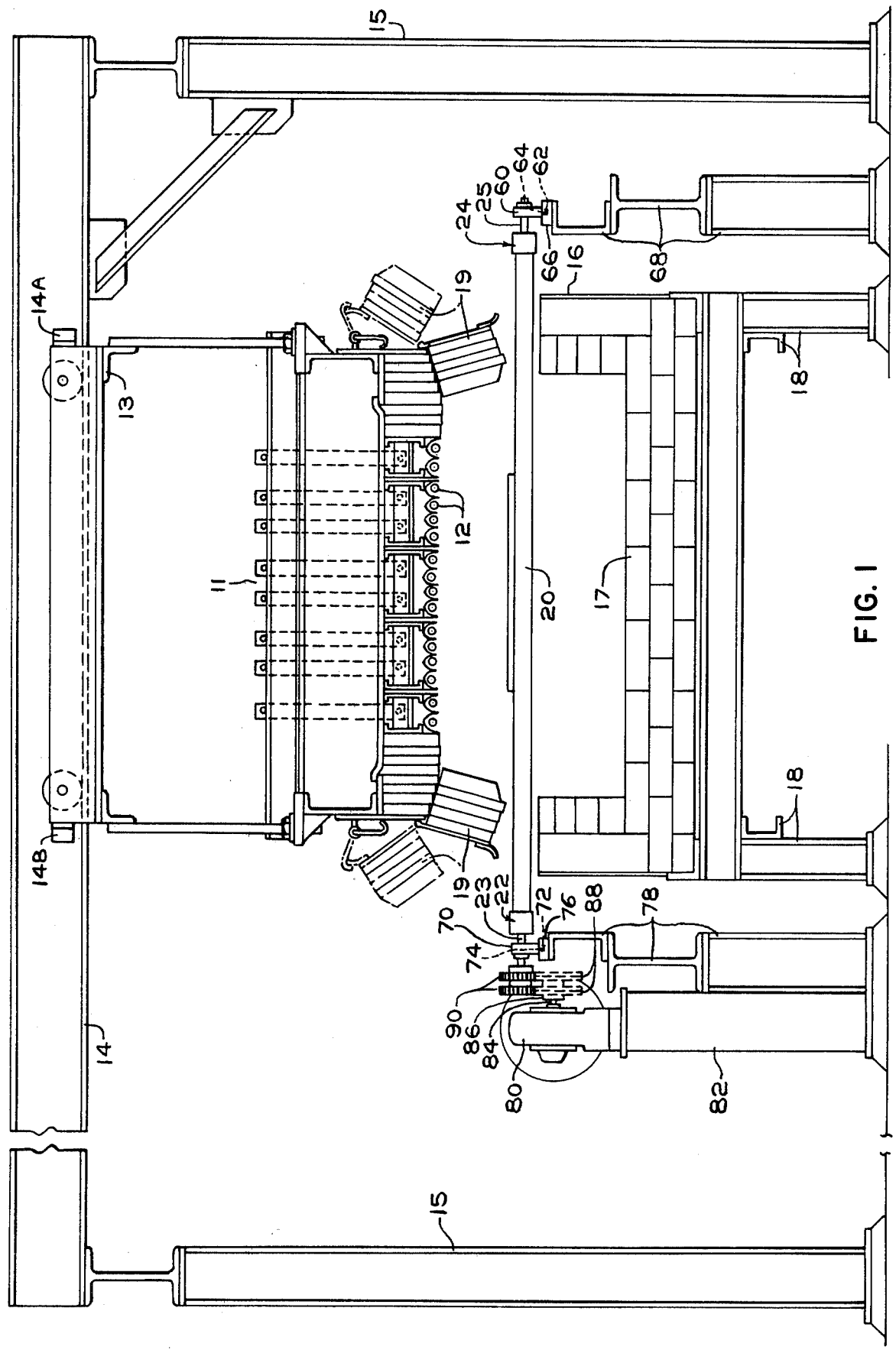
FIG. 1 is a sectional view taken across a furnace provided with ceramic conveyor rolls having composite metal end caps secured thereto in a manner conforming to the present invention.

In order to understand the present invention, a brief description of a furnace containing ceramic rolls provided with metal end caps secured thereto in the manner of the present invention will be described. In FIG. 1, a cross-section view of a furnace is shown. The furnace comprises a plurality of furnace sections disposed in end-to-end relation. Each section has a roof portion 11 having electrical heaters 12 supported from an overhead carrier 13 that is movable transversely of the length of the furnace along overhead beams 14. Fixed stop members 14A and removable stop members 14B are provided on beams 14 to define an operating position for each roof portion 11 over the lower portion of the furnace. The beams extend transversely of the furnace length a sufficient transverse distance to enable one to move the roof portion 11 a transverse distance sufficient to clear the furnace. Vertical columns 15 are provided on each side of the furnace to support the opposite transverse ends of the beams 14. Reinforcing braces may also be included.

The furnace is also provided with a bottom portion including a pair of sidewalls 16 extending upward from a floor 17. The sidewalls 16 and floor 17 are of refractory material encased in a metal casing, which is supported above the floor of a building by a conventional metal support structure 18.

Along the length of each side of the furnace, several doors 19 of laminated insulating material are pivoted in transversely aligned pairs to the sides of the roof portion for pivoting relative to the lower end of the roof portion 11 between an open or raised position (depicted in phantom) that provides access to the furnace interior and a closed position in which the doors 19 hang downward from the bottom sides of the roof portion 11 to provide narrow elongated openings for the receipt of ceramic conveyor rolls 20 that extend across the width of the furnace. If needed, packing of insulating material may be stuffed into openings between adjacent rolls to further enclose the space between the pivoted doors 19 and the upper ends of the side walls 16. The conveyor rolls are spaced from one another longitudinally of the furnace to provide longitudinally spaced rolling supports for transporting glass sheets through the length of the furnace. The length of the pivoted doors 19 is such as to expose a series of consecutive rolls when a single door on each side of the furnace is pivoted upward and hooked to the roof portion to permit access to the interior of the furnace without requiring lateral displacement of the roof portion 11.

Each ceramic conveyor roll 20 is provided with a composite metal end cap 22 at its driving end thereof and an additional composite metal end cap 24 at its end opposite the driving side. A drive shaft 23 is integral with and extends axially outward from the central portion of one component of the metal end cap 22 and an additional shaft 25 is integral with and extends outwardly in a similar manner from the central portion of the corresponding component of the metal end cap 24. The specific construction that drivingly connects the drive shaft 23 to a drive motor 80 and that provides bearing support for shafts 23 and 25 will be described later.

The conveyor rolls of the present invention are essentially cylindrically shaped fused silica rolls 20 extending throughout the entire width of the furnace through horizontally aligned openings between the closed doors 19 and the upper ends of the side walls 16 and through any insulating packing that may be included to improve the manner in which the end caps are insulated from the furnace heat.

The gist of the present invention involves the specific construction of the metal end caps 22 and 24 and the manner in which they are mounted in frictional engagement around the opposite ends of their associated ceramic conveyor roll 20.

Figure 5:
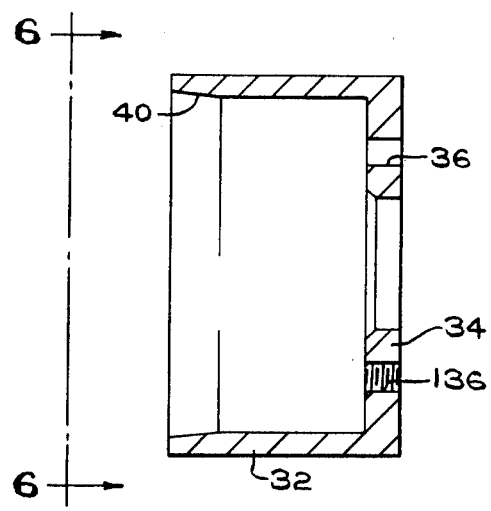
FIG. 5 is a sectional view of an empty outer cap member.
Figure 6:
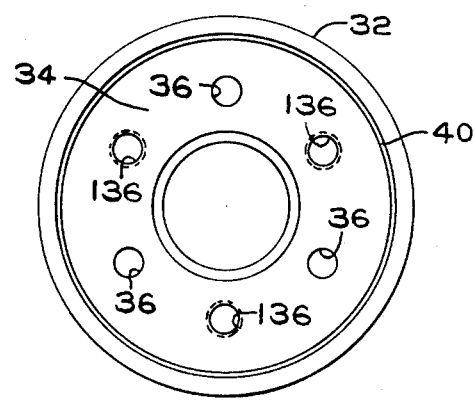
FIG. 6 is an end view of the outer cap member taken along line 6—6 of FIG. 5 depicting its apertured head.
Figure 7:
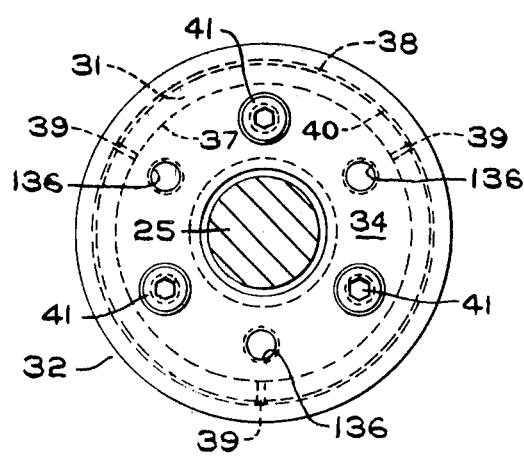
FIG. 7 is a sectional view taken along the line 7—7 of FIG. 1, showing how the end cap members are assembled relative to one another.

Each end cap 22 and 24 comprises an inner flexible cap member 31 (FIGS. 2, 3 and 4) integral to be rotatable with either the driving shaft 23 or the additional shaft 25 and an outer, rigid cap member 32 axially movable relative to the inner cap member 31. The shafts 23 and 25 extend in opposite directions axially outward from the center portion of a respective outer, apertured, circular head 33 for the inner cap member 31. Three internally threaded apertures 35 are provided at 120 degree apart radial lines in head 33. The outer cap member 32 (FIGS. 2, 5 and 6) is provided with a head 34 having six apertures including alternate unthreaded apertures 36 and threaded apertures 136, provided at 60 degree apart radial lines so that alternate unthreaded apertures 36 are aligned with apertures 35 and alternate apertures 136 are misaligned with any aperture in head 33 to be suitable to receive jack shafts.

The inner wall 37 of inner cap member 32 is cylindrical while its outer wall 38 diverges from the inner wall 37 in an inward axial direction relative to the length of the roll 20 on which the inner cap member 31 is mounted. A plurality of axially extending slots 39 are cut out of the inner axial end of the inner end cap member 31 to impart flexibility thereto.

The outer end cap member 32 is of true cylindrical shape, except for a short tapered portion 40 at the inner axial end thereof which improves the chances of proper centering of the outer cap member over the inner end cap member. In assembling the composite end caps 22 and 24 to the ceramic roll 20, each inner end cap member 31 is spring fit over a corresponding end of roll 20. Then, the outer end cap member 32 is initially moved toward the inner end cap member 31 and rotated until certain of its alternate unthreaded apertures 36 in its head 34 are in alignment with the apertures 35 in the head 33 of the inner flexible cap member 31.

Attachment bolts 41 are inserted into the aligned apertures 35 and 36 and screwed tightly to fit the rigid outer end cap member 32 over the flexible inner end cap member 31. As the bolts force the outer end cap member 32 from the position depicted for end cap 24 at the right of FIG. 2 to the assembled arrangement of end cap 22 to the left of FIG. 2, the outer rigid end cap member 32 clamps the flexible end cap member 31 radially with increasing radial pressure against the end portion of the ceramic roll 20. This provides a controlled compression stress of metal against ceramic sufficient to prevent slippage and yet insufficient for the flexible metal inner end cap member to cause undue damage to the ceramic roll.

The additional apertures 136 in the head 34 of the end cap 22 or 24 that are not aligned with corresponding apertures 35 in head 33 provide air vents when the composite end caps of the present invention are being assembled in clamped relation over the ends of the ceramic roll 20.

When a ceramic roll 20 must be removed, it is a simple matter to unscrew the bolts 41 from aligned apertures 35 and 36 and insert the bolts into the apertures 136 in the head 34 that are not aligned with apertures 35 in head 33. The bolts 41 cooperate with apertures 136 to serve as jack screws to separate the rigid outer end cap member 32 from the resilient inner end cap member 31. With rigid outer end cap member 32 separated from clamping position about inner end cap member 31, it becomes easy to separate the resilient inner end cap member 31 from the end of the ceramic roll 20.

It is understood that while the outer wall surface 38 of inner end cap member 31 is shown as diverging outward in an axially inner direction of inner wall surface 37, as an alternative, the inner wall surface of outer end cap member 32 may diverge radially inward to clamp the inner end cap member 31 against the end portion of ceramic roll 20 on axially inward movement of the rigid outer end cap member 32 relative to the flexible inner end cap member 31. In another alternative, both interfacial wall surfaces of the inner and outer end cap members may be tapered toward the facing interfacial wall of the other end cap member in an axial inward direction to provide a clamping action in a radial direction of the flexible inner end cap member 31 against the ceramic roll on axially inward movement of rigid outer end cap member 32 thereover.

A bearing housing 60 is provided with a bearing to receive the shaft 25. An alignment pin 62 extends downward from the housing 60 to fit into a receiving hole 64 provided at a proper location along the length of a horizontal alignment member 66. The horizontal alignment member 66 is located below the bearing housing 60 and rests on the upper surface of a bearing support structure 68. The drive shaft 23 extends through and beyond a bearing housing 70 provided with an alignment pin 72 that is received in a pin-receiving hole 74 of a horizontal alignment member 76 that is supported on a bearing support structure 78 in a manner similar to the support provided on the other side of the furnace by the bearing housing 60, its alignment pin 62, and its associated pin-receiving hole 64 in its respective alignment member 66 supported on the bearing support structure 68.

The drive for rotating a plurality of ceramic rolls 20 in unison is provided by a drive motor 80 resting on a drive motor support 82 (FIG. 1). The motor 80 drives a main drive shaft 84 and a lower double drive sprocket 86 fixed to the main drive shaft 84 for rotation therewith. The lower double drive sprocket 86 drives a continuous chain 88, upon which is superimposed an upper double sprocket 90 fixed to the outer end of the drive shaft 23. Thus, the drive motor 80 drives a plurality of drive shafts 23 in unison. The drive shaft 23 is keyed for engagement with a keyway (not shown) to permit thermal expansion of the conveyor roll and avoid binding.

Whenever it is necessary to remove a ceramic roll from the furnace, the doors 19 that are laterally opposite from one another can be pivoted into an open position where they may be temporarily supported through hooks and the roll together with its associated composite metal end caps 22 and 24, comprising shafts 23 and 25 integral with the flexible inner end cap members 31 and attached outer end cap members 32, double sprockets 90 and the bearing housings 60 and 70 with their alignment pins 62 and 72 can be lifted from the pin-receiving holes 64 and 74, thereby removing the roll from the furnace very readily, where the roll repair or replacement work can be accomplished with minimum disruption of furnace operation. Another ceramic roll with its metal end caps 22 and 24, shafts 23 and 25, bearing housings 60 and 70, alignment pins 62 and 72, and the double sprockets 90 can readily replace the one that was removed in a relatively short time. The doors 19 are unhooked to pivot into their lower positions, packing is applied and the furnace can continue its operation with a minimum of down time.

The form of the invention shown and described in this disclosure represents an illustrative preferred embodiment of composite metal end caps that provide connections of controlled clamping between a rotating metal drive shaft integral with a relatively flexible, metal, inner end cap member of said composite end cap and a ceramic roll whose magnitude of clamping can be controlled by adjusting the relative axial position of a relatively rigid metal, outer end cap member to its associated inner end cap member of said composite metal end cap. The clamping force through the resilient, metal, inner end cap member can be adjusted to be sufficient to avoid slippage and yet not so large as to develop undue ceramic roll breakage. It is understood that various changes may be made without departing from the gist of the invention as defined in the claimed subject matter that follows.

We claim:

1. A conveyor for conveying glass sheets during thermal treatment comprising a plurality of ceramic rolls longitudinally spaced from one another, each roll having an axially elongated substantially cylindrical shape extending transversely thereof, and a metal shaft located in alignment with each end of said roll, and means for drivingly connecting at least one of said shafts to said roll, said means comprising a metal, inner end cap member integral with and substantially concentric to said shaft and adapted to surround an end portion of said ceramic roll in flexible clamping relation thereto in direct contact therewith and constructed and arranged to flex radially inward in at least its axially inner end to provide a clamping force thereagainst, a metal, outer end cap member more rigid than said inner end cap member surrounding said inner end cap member, and means causing said outer end cap member to move axially with respect to said inner end cap member in order to increase said clamping force between the metal of said metal, inner end cap member and the ceramic roll in response to axial inward movement therebetween and to permit release of said clamping force in response to axial outward movement of said outer end cap member out of engagement with said inner end cap member.

2. A conveyor as in claim 1, wherein said inner end cap member is of substantially cylindrical shape and its axially inner end is provided with circumferentially spaced, axially extending slots to enable the axially inner slotted portion of said inner end cap member to flex radially, said inner end cap member having an outer circumferential interfacial surface and said outer end cap member having an inner circumferential interfacial surface, at least one of said interfacial surfaces tapering in a direction that causes the axially inner slotted portion of the inner end cap member to flex radially inward in response to axially inward movement of said outer end cap member and to be free to flex radially outward in response to axially outward movement of said outer end cap member.

3. A conveyor as in claim 1 or 2, wherein said inner end cap member has an axially outer head portion with a plurality of internally threaded apertures and said outer end cap member has an axially outer head portion with a plurality of apertures, at least some of said apertures through the head portion of said outer end cap member being aligned with a corresponding number of said plurality of internally threaded apertures through the head portion of said inner end cap member to receive attachment bolts therethrough to secure said end cap members together and to increase a clamping force between said flexible, metal, inner end cap member against said ceramic roll upon moving the attachment bolts axially inward.

4. A conveyor as in claim 3, wherein said head portion of said outer end cap member is provided with at least one internally threaded aperture that is misaligned from any of the apertures through the head portion of said inner end cap member to accommodate a jack screw for releasing said outer end cap member from said inner end cap member.

5. A conveyor as in claim 3, wherein said inner end cap member has an outer wall surface that diverges radially outward in an axially inward direction from a cylindrically shaped inner wall surface and said outer end cap member has an inner wall surface of substantially cylindrical configuration except for a radially outward tapered portion at its extreme axially inner end.

* * * * *